United States Patent
Okada

(10) Patent No.: US 11,099,345 B2
(45) Date of Patent: Aug. 24, 2021

(54) METHOD OF WINDING OPTICAL FIBER, METHOD OF MANUFACTURING BOBBIN-WOUND OPTICAL FIBER, OPTICAL FIBER WINDER, AND METHOD OF MANUFACTURING OPTICAL FIBER STRAND

(71) Applicant: FUJIKURA LTD., Tokyo (JP)

(72) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 241 days.

(21) Appl. No.: 16/357,028

(22) Filed: Mar. 18, 2019

(65) Prior Publication Data
US 2019/0331872 A1 Oct. 31, 2019

(30) Foreign Application Priority Data
Apr. 27, 2018 (JP) .............................. JP2018-087148

(51) Int. Cl.
| | |
|---|---|
| *G02B 6/44* | (2006.01) |
| *B65H 55/04* | (2006.01) |
| *B65H 75/14* | (2006.01) |
| *C03B 37/03* | (2006.01) |

(52) U.S. Cl.
CPC ........... *G02B 6/4457* (2013.01); *B65H 55/04* (2013.01); *B65H 75/14* (2013.01); *C03B 37/032* (2013.01); *B65H 2701/32* (2013.01)

(58) Field of Classification Search
CPC .... B65H 54/12; B65H 54/2884; B65H 55/04; B65H 2701/32
See application file for complete search history.

(56) References Cited

U.S. PATENT DOCUMENTS 4,696,438 A * 9/1987 Myers .................... B65H 55/00
242/118.41

FOREIGN PATENT DOCUMENTS

| CN | 105859120 A | 8/2016 |
|---|---|---|
| JP | S39-026352 B | 11/1964 |
| JP | S51-119966 A | 10/1976 |
| JP | S61267663 A | 11/1986 |
| JP | S63-117924 A | 5/1988 |

(Continued)

OTHER PUBLICATIONS

Notification of Reasons for Refusal issued in corresponding Japanese Patent Application No. 2018-087148, dated Feb. 4, 2020 (10 pages).

*Primary Examiner* — William E Dondero
(74) *Attorney, Agent, or Firm* — Osha Bergman Watanabe & Burton LLP

(57) ABSTRACT

A method of winding an optical fiber includes winding the optical fiber using a bobbin that includes: a body portion having two end portions; and a pair of flanges, respectively disposed at the end portions in an axial direction of the body portion. An inner surface of each of the flanges is inclined toward an outer side in the axial direction and toward a radial outer side. The method further includes guiding the optical fiber to the bobbin using a final pulley. The bobbin and the final pulley reciprocate relative to each other in the axial direction at a traverse speed V (mm/sec) such that $0.0050 \leq \theta$ (rad) $\leq 0.1000$, where $\theta$ is a delay angle, $\theta = \arctan(V/L)$, and L (mm) is a distance from a winding position of the optical fiber at the bobbin to the final pulley in a radial direction.

6 Claims, 9 Drawing Sheets

(56) References Cited

FOREIGN PATENT DOCUMENTS

| | | |
|---|---|---|
| JP | H01-209276 A | 8/1989 |
| JP | H07-503690 A | 4/1995 |
| JP | 2000-203870 A | 7/2000 |
| JP | 2011063381 A | 3/2011 |
| JP | 2014001054 A | 1/2014 |

* cited by examiner

METHOD OF WINDING OPTICAL FIBER, METHOD OF MANUFACTURING BOBBIN-WOUND OPTICAL FIBER, OPTICAL FIBER WINDER, AND METHOD OF MANUFACTURING OPTICAL FIBER STRAND

CROSS REFERENCE TO RELATED APPLICATIONS

This application claims priority from Japanese Patent Application No. 2018-087148 filed on Apr. 27, 2018, the contents of which are incorporated herein by reference in their entirety.

BACKGROUND

Field of the Invention

The present invention relates to a method of winding an optical fiber, a method of manufacturing a bobbin-wound optical fiber, an optical fiber winder, and a method of manufacturing an optical fiber strand.

Description of the Related Art

Conventionally, a method of winding an optical fiber as disclosed in Japanese Unexamined Patent Application, First Publication No. 2014-1054 is known.

In this method of winding an optical fiber, a traverse mechanism for moving a winding bobbin in an axial direction thereof is used. The traverse mechanism is configured to reverse a moving direction of the bobbin with respect to a final pulley that guides the optical fiber to the bobbin when the optical fiber wound around the bobbin approaches a flange of the bobbin.

In recent years, increase in size of an optical fiber preform and speeding-up of optical fiber manufacturing have progressed. In order to improve a manufacturing efficiency, the length of the optical fiber that can be wound around one bobbin needs to be increased.

In order to increase a length of the optical fiber that can be wound around one bobbin, it is effective to use a tapered bobbin in which an inner surface of a flange thereof is inclined to be directed toward an outer side in an axial direction toward a radial outer side.

Incidentally, in a case of using a tapered bobbin, since the inner surface of the flange is inclined, a position of the optical fiber wound on the inclined surface in the axial direction changes as a winding amount of the optical fiber increases. Therefore, in order to make a winding state satisfactory it is necessary to precisely control a position of the bobbin with respect to a final pulley in accordance with an increase in the winding amount.

SUMMARY

One or more embodiments of the invention provide a satisfactory winding state when an optical fiber is wound using a tapered bobbin.

A method of winding an optical fiber according to one or more embodiments of the invention includes a winding process of winding the optical fiber using a bobbin, the bobbin including a body portion and a flange, the flange being provided at both end portions in an axial direction of the body portion, the flange having an inner surface, the inner surface being inclined to be directed toward an outer side in the axial direction toward a radial outer side, in which a final pulley that guides the optical fiber to the bobbin and the bobbin perform reciprocation relative to each other in the axial direction at a traverse speed V (mm/sec) so that $0.0050 \leq \theta \leq 0.1000$ is satisfied when a distance from a winding position of the optical fiber at the bobbin to the final pulley in the radial direction is set as L (mm) and a delay angle calculated from $\theta = \arctan(V/L)$ is set as $\theta$ (rad).

A method of manufacturing a bobbin-wound optical fiber according to one or more embodiments of the invention includes a process of obtaining the bobbin-wound optical fiber by winding the optical fiber around the bobbin using the above-described method of winding an optical fiber.

An optical fiber winder according to one or more embodiments of the invention includes a bobbin mounting portion on which a bobbin is mounted, the bobbin including a body portion and a flange, the flange being provided at both end portions in an axial direction of the body portion, the flange having an inner surface, the inner surface being inclined to be directed toward an outer side in the axial direction toward a radial outer side, a final pulley which guides an optical fiber to the bobbin, and a traverse mechanism which relatively reciprocates the bobbin and the final pulley in the axial direction at a traverse speed V (mm/sec), in which, the traverse mechanism reciprocates the bobbin or the final pulley so that $0.0050 \leq \theta \leq 0.1000$ is satisfied when a distance from a winding position of the optical fiber at the bobbin to the final pulley in the radial direction is set as L (mm) and a delay angle calculated from $\theta = \arctan(V/L)$ is set as $\theta$ (rad).

An optical fiber strand manufacturing apparatus according to one or more embodiments of the invention includes a drawing unit in which an optical fiber preform is drawn to form a bare optical fiber, a coater which forms the optical fiber strand by providing a coating layer on an outer circumference of the bare optical fiber, a take-up unit which takes up the optical fiber strand, and the optical fiber winder.

According to one or more embodiments of the invention, a satisfactory winding state can be obtained when an optical fiber is wound using the tapered bobbin.

DETAILED DESCRIPTION

Hereinafter, a method of winding an optical fiber, a method of manufacturing a bobbin-wound optical fiber, an optical fiber winder, and a method of manufacturing an optical fiber strand according to one or more embodiments will be described with reference to the drawings.

In the present specification, a bare optical fiber on which a coating is provided is referred to as an optical fiber strand.

Also, a bare optical fiber and an optical fiber strand are collectively referred to as an "optical fiber." Also, an optical fiber wound around a bobbin is called a "bobbin-wound optical fiber."

Figure 1:
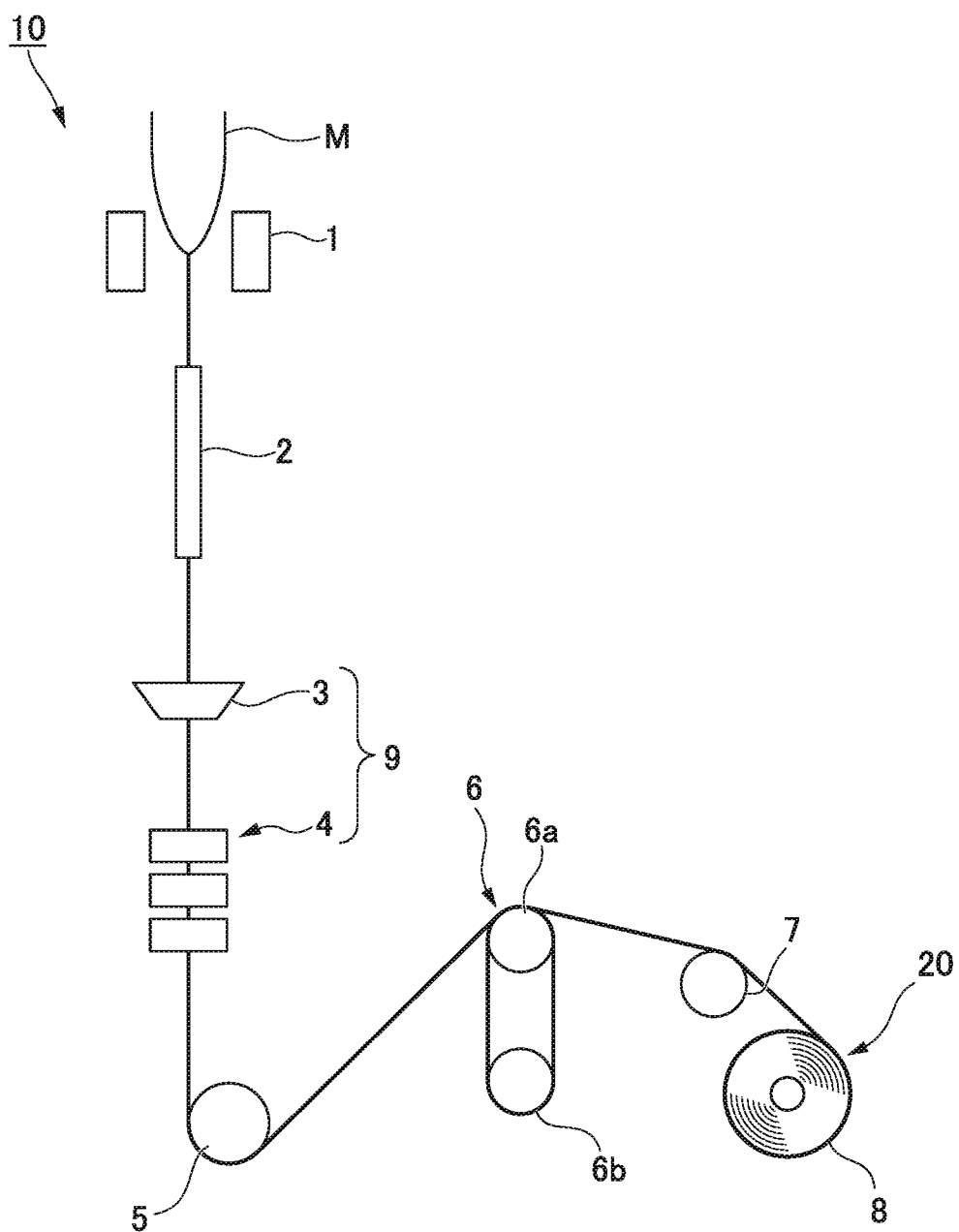
FIG. 1 is a schematic view showing an optical fiber manufacturing apparatus in accordance with one or more embodiments.

An optical fiber strand of one or more embodiments is manufactured by drawing a fiber from an optical fiber preform M using a manufacturing apparatus 10 as shown in FIG. 1. The manufacturing apparatus 10 includes a drawing unit 1, a cooling device 2, a coater 9 having a coating device 3 and a coating curing device 4, a take-up unit 5, a dancer unit 6, a final pulley 7, and a winder 20.

Figure 2:
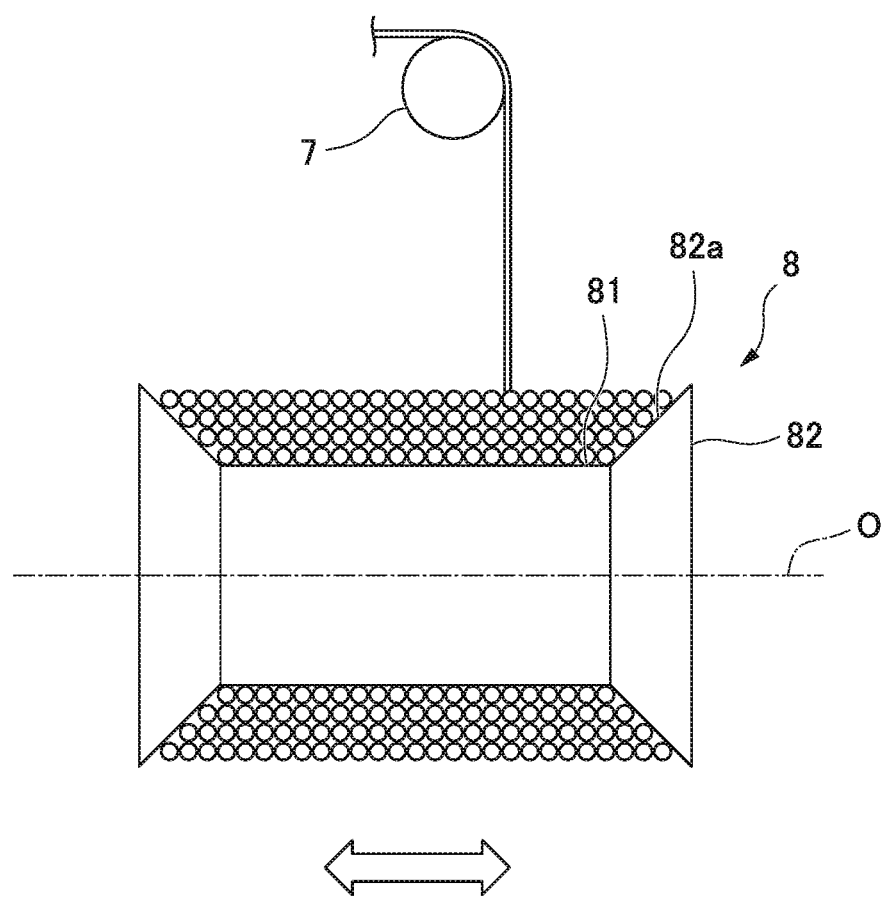
FIG. 2 is a schematic view showing a tapered bobbin on which an optical fiber is wound in accordance with one or more embodiments.

The winder 20 winds the optical fiber around the bobbin 8 shown in FIG. 2.

The bobbin 8 is a bobbin for temporarily winding and holding a manufactured optical fiber. The bobbin 8 includes a body portion 81 and a pair of flanges 82. The body portion 81 is cylindrical, and the pair of flanges 82 are respectively disposed at both end portions in an axial direction of the body portion 81.

An outer diameter (diameter) of the body portion 81 is, for example, φ 300 mm to 600 mm, and a width of the body portion 81 in the axial direction is, for example, 500 mm to 1500 mm. A material of the bobbin 8 is not particularly limited, and a resin material such as a vinyl chloride resin or an acrylonitrile butadiene styrene (ABS) resin in addition to a metal material such as aluminum, or stainless steel, or the like can be appropriately used.

Definition of Directions

In one or more embodiments, a direction along a central axis O of the bobbin 8 is referred to as an "axial direction." Also, when viewed from the axial direction, a direction intersecting the central axis O is referred to as a "radial direction," and a direction of revolving around the central axis O is referred to as a "circumferential direction." Also, when viewed from each of the flanges 82, a side on which the body portion 81 is positioned in the axial direction is referred to as an "inner side in the axial direction," and a side opposite thereto is referred to as an "outer side in the axial direction."

In the flange 82, an inner surface 82a facing the inside in the axial direction is inclined to be gradually directed toward the outer side in the axial direction and toward a radial outer side (i.e., outer side of the bobbin 8 in the radial direction). That is, the bobbin 8 of one or more embodiments is a tapered bobbin in which the inner surface 82a of the flange 82 is a tapered surface. By using such a tapered bobbin 8, it is possible to perform a so-called "inverse-tapered winding" in which a winding amount in the axial direction increases as a winding position moves toward the radial outer side. Advantages of the inverse-tapered winding will be described below.

(Manufacturing Apparatus)

The drawing unit 1 shown in FIG. 1 includes a heating furnace (heater) for heating the optical fiber preform M.

In the drawing unit 1, a drawing process in which the optical fiber preform M is drawn to form a bare optical fiber is performed. In the drawing process, the optical fiber preform M inserted into the heating furnace is heated to, for example, approximately 2000° C. or higher and melted.

The cooling device 2 cools the bare optical fiber drawn out from the optical fiber preform M. Further, the bare optical fiber may be cooled by natural cooling without using the cooling device 2.

In the coating device 3, an outer circumference of the bare optical fiber is coated with an ultraviolet (UV) curable resin or the like to form a coating layer using die coating or the like. Thereafter, the coated UV curable resin or the like are cured by the coating curing device 4. In this way, the coater 9 forms an optical fiber strand by providing the coating layer on the outer circumference of the bare optical fiber.

The coating layer has a two-layer structure of, for example, a primary layer and a secondary layer. A Young's modulus of the primary layer is, for example, approximately 0.3 to 1.0 MPa, and a Young's modulus of the secondary layer is approximately 500 to 1500 MPa. Further, the coating layer may have a single layer structure or may have three or more layers.

The take-up unit 5 takes up the optical fiber strand. The take-up unit 5 is, for example, a take-up capstan, and a fiber drawing speed of the optical fiber strand is determined by the take-up unit 5. The fiber drawing speed is, for example, 25 msec or more.

The dancer unit 6 is positioned between the take-up unit 5 and the final pulley 7. The dancer unit 6 includes a fixed pulley 6a having a fixed position and a dancer pulley 6b being displaced with respect to the fixed pulley 6a. In the dancer unit 6, the optical fiber is wrapped around the fixed pulley 6a and the dancer pulley 6b. The dancer unit 6 corrects a difference between a take-up speed of the take-up unit 5 that determines a linear velocity of the fiber drawing and a winding speed of the bobbin 8.

In one or more embodiments, the take-up speed constantly varies in order to perform control of an outer diameter of the bare optical fiber in the drawing process. The winding speed is a speed converted from a winding position in the radial direction of the optical fiber (hereinafter referred to as a winding diameter) wound around the bobbin 8 and a rotation speed of the bobbin 8. Since the optical fiber is wound around the body portion 81 and the inner surface 82a of the bobbin 8 in sequence, the winding diameter gradually increases in accordance with a thickness of the wound optical fiber (winding thickness).

For example, when the winding speed is a constant speed, when a take-up linear velocity is increased for controlling the outer diameter of the bare optical fiber, the dancer pulley 6b moves in a direction away from the fixed pulley 6a so that the optical fiber does not become slack between the take-up unit 5 and the final pulley 7. Therefore, the distance between the two pulleys 6a and 6b increases. The dancer unit 6 is configured to detect a change (increment) in the distance between the two pulleys 6a and 6b and output a signal corresponding to the increment to the winder 20. The signal may be data of the distance itself or change in distance between the two pulleys 6a and 6b, or may be a command to vary the winding speed on the basis of the data.

Similarly, when the take-up speed decreases, since the distance between the two pulleys 6a and 6b decreases, the dancer unit 6 outputs a signal corresponding to the decrease to the winder 20.

Further, a configuration of the dancer unit 6 is not limited to the above, and can be changed as appropriate.

The winder 20 is configured to accelerate or decelerate the winding speed on the basis of the signal from the dancer unit 6. In this way, the dancer unit 6 and the winder 20 are configured to change the winding speed according to the variation of the take-up speed.

The final pulley 7 changes a traveling direction of the optical fiber and guides it to the bobbin 8. In FIG. 1, a rotation axis of the final pulley 7 is disposed parallel to the central axis O of the bobbin 8. The disposition is not limited to this example shown in the drawing, and the rotation axis of the final pulley 7 and the central axis O of the bobbin 8 need not be disposed parallel to each other.

Figure 3:
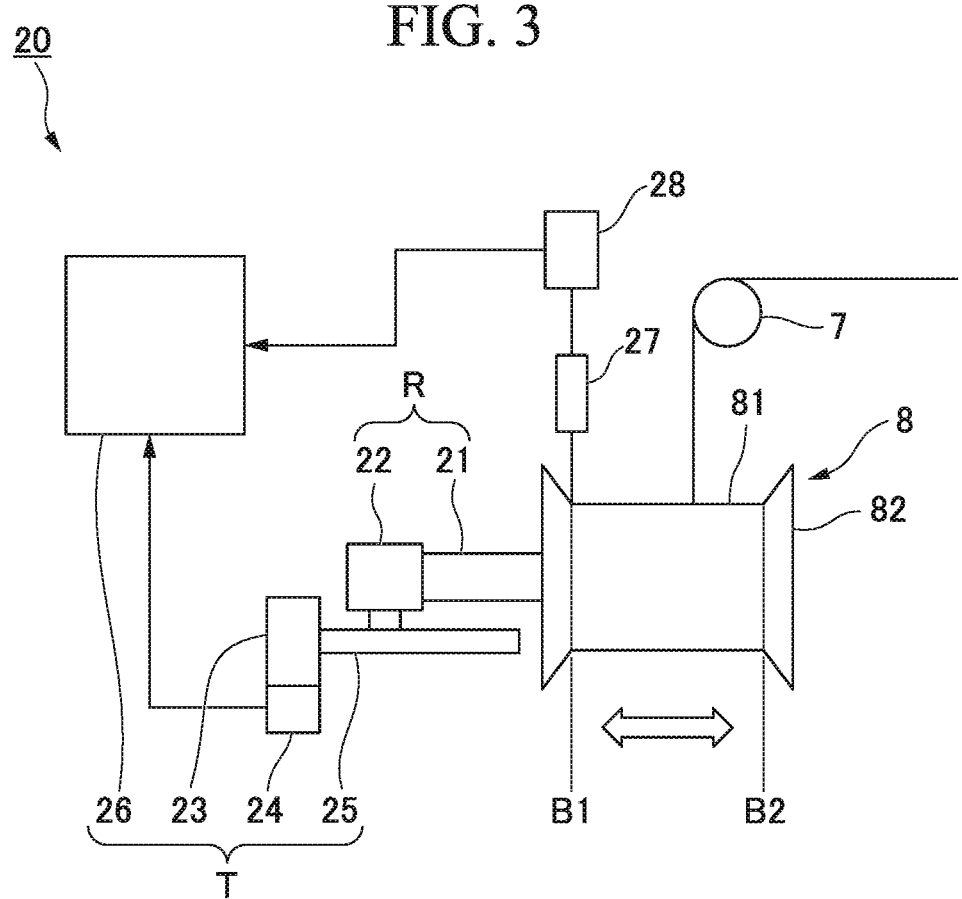
FIG. 3 is a schematic view showing an optical fiber winder in accordance with one or more embodiments.

FIG. 3 shows the winder 20 of a bobbin traverse method in which the bobbin 8 is reciprocated relative to the final pulley 7. Further, there is no limitation to the bobbin traverse method, and a winder 20 for a method in which the final pulley 7 is moved relative to the bobbin 8 may be used.

In order to wind the optical fiber around the bobbin 8, the winder 20 reciprocates the bobbin 8 in the axial direction at a predetermined speed while rotating the bobbin 8 in the circumferential direction. Therefore, a position in the axial direction of the bobbin 8 with respect to the final pulley 7 (hereinafter referred to as a traverse position) regularly changes.

A distance in which the bobbin 8 is reciprocated in the axial direction is defined as a movement distance W. Also, a distance moved in the reciprocation of a first reciprocation (at the time of winding start) is defined as an initial traverse distance W1. The initial traverse distance W1 is to the same as a width of the body portion 81 in the axial direction. When the bobbin 8 is moved in the axial direction, the winding position in the axial direction of the optical fiber on the bobbin 8 changes. Therefore, continuous winding of the optical fiber at a same place in the axial direction can be inhibited. Further, the optical fiber being wound can be moved by a predetermined pitch (winding pitch) in the axial direction each time the bobbin 8 is rotated 360° in the circumferential direction.

As shown in FIG. 2, when the tapered bobbin 8 of which the inner surface 82a is inclined is used, it is necessary to increase the movement distance W in accordance with an increase in the winding diameter. In order to increase the movement distance W, it is necessary to gradually change a position at which a moving direction of the reciprocation is reversed (hereinafter referred to as "reversal position") toward the outer side in the axial direction. That is, it is necessary to update (i.e., adjust) the reversal position according to the winding diameter. Then, the reversal position needs to be updated with respect to each of the two flanges 82. Here, in one of the flanges 82 of the bobbin 8, a difference in the axial direction between a reversal position in a certain reciprocation and a reversal position changed in a subsequent reciprocation is defined as a traverse movement amount W2.

The winder 20 performs a winding process of obtaining a bobbin-wound optical fiber by winding the optical fiber around the bobbin 8. As shown in FIG. 3, the winder 20 includes a traverse mechanism T and a rotation mechanism R. The traverse mechanism T is configured to reciprocate the bobbin 8 and the final pulley 7 relative to each other in the axial direction. The rotation mechanism R is configured to rotate the bobbin 8 in the circumferential direction.

The rotation mechanism R includes a bobbin mounting portion 21 and a bobbin rotation motor 22. The bobbin mounting portion 21 supports the bobbin 8. In an example shown in FIG. 3, a mounting shaft that passes through the central axis O of the bobbin 8 and can fix the bobbin 8 is used for the bobbin mounting portion 21. The bobbin rotation motor 22 rotates the bobbin 8 supported by the bobbin mounting portion 21 in the circumferential direction.

The traverse mechanism T includes a servomotor 23, a rotary encoder 24, a ball screw 25, and a traverse controller 26. The traverse mechanism T of one or more embodiments causes the bobbin 8 and the rotation mechanism R to reciprocate with respect to the final pulley 7. The servomotor 23 rotates the ball screw 25 to move the bobbin 8 and the rotation mechanism R in the axial direction and controls the traverse position, the reversal position, and the like of the bobbin 8 or the rotation mechanism R on the basis of a command from the traverse controller 26. The ball screw 25 is disposed parallel to a traverse direction (axial direction) of the bobbin 8, and has screws formed on an outer circumferential surface. The rotary encoder 24 detects a rotation speed, a phase, or the like of the servomotor 23 or the ball screw 25.

The traverse controller 26 calculates the traverse position using information such as an output from the rotary encoder 24, a gear ratio of a speed reducer (not shown) of the servomotor 23, and a screw pitch of the ball screw 25. Also, the traverse controller 26 controls the traverse position, the reversal position, or the like of the bobbin 8 by outputting a command to the servomotor 23. Further, the traverse controller 26 may be incorporated in another controller or the like as a traverse control system.

Further, the winder 20 includes a flange position detection sensor 27 to detect a position of the flange 82 of the bobbin 8. The flange position detection sensor 27 is fixed to, for example, a frame or the like such that it does not move at the time of the traversing of the bobbin 8. Before winding of the optical fiber is started, the flange position detection sensor 27 detects boundary positions B1 and B2 between the respective flanges 82 and the body portion 81 of the bobbin 8 mounted on the bobbin mounting portion 21 in advance. In one or more embodiments, two boundary positions corresponding to the two flanges 82 are respectively referred to as a first boundary position B1 and a second boundary position B2.

For the flange position detection sensor 27, for example, a non-contact distance sensor using a laser beam or the like can be used. In a case in which a distance sensor is used, when the bobbin 8 is moved in the axial direction, a portion at which a distance from the flange position detection sensor 27 to the bobbin 8 in the radial direction starts to change can be set as the boundary positions B1 and B2. Therefore, it is possible to detect different boundary positions B1 and B2 for each bobbin 8 before starting the winding process. Further, a deviation of the boundary positions B1 and B2 due to variations in mounting the bobbin 8 on the bobbin mounting portion 21 can be corrected.

Information on the boundary positions B1 and B2 is output to the traverse controller 26 via an amplifier 28. The traverse controller 26 determines a width in the axial direction of the body portion 81, that is, the initial traverse distance W1 in the reciprocation of the first reciprocation using the information of the two boundary positions B1 and B2.

Further, although not shown, a winder for a pulley traverse method in which the final pulley 7 reciprocates in the axial direction relative to the bobbin 8 may be used. In this case, the traverse mechanism T may be configured so that the final pulley 7 reciprocates, and the flange position detection sensor 27 may be fixed to a frame moving together with the final pulley 7. In this way, the final pulley 7 and the bobbin 8 need only be capable of reciprocating relative to each other in the axial direction.

After the optical fiber is wound around the bobbin 8, in a process of excluding a defective portion, a non-defective product candidate portion is cut off appropriately and each non-defective product candidate portion has a single length of approximately 50 km to 300 km. For a non-defective product candidate portion, measurements such as optical characteristics are performed. A non-defective product candidate portion on the basis of the measurement results satisfying product standards becomes a non-defective product and is used as a product. The non-defective portion is shipped after being wound again around a shipping bobbin or shipped after being made into a cable.

As described above, since the manufactured optical fiber is wound around the bobbin 8 and fed from the bobbin 8 in each of the processes, it is important to wind the bobbin 8 in an appropriate winding state.

Incidentally, in recent years, an increase in size of the optical fiber preform M has progressed for the purpose of cost reduction or the like. In one example, a large-sized optical fiber preform M capable of manufacturing an optical fiber of 1000 km or more is used, and there are cases in which an optical fiber of 4000 km or more is manufactured with an even larger optical fiber preform M. On the other hand, an optical fiber can be divided into a predetermined length (for example, 500 km or 1000 km) to be wound around the bobbin 8, but in order to improve a manufacturing efficiency of an optical fiber, it is preferable to increase an amount of an optical fiber wound around one bobbin 8 as much as possible. This is because effects such as shortening of an operation time for replacing the bobbin 8 can be obtained.

As a method of winding an optical fiber around one bobbin 8, in addition to the inverse-tapered winding of one or more embodiments, a method such as flat winding or tapered winding can be exemplified. In flat winding and tapered winding, as shown in FIGS. 7 and 8, a bobbin 100 in which a flange 102 is upright with respect to a body portion 101 is used.

Figure 7:
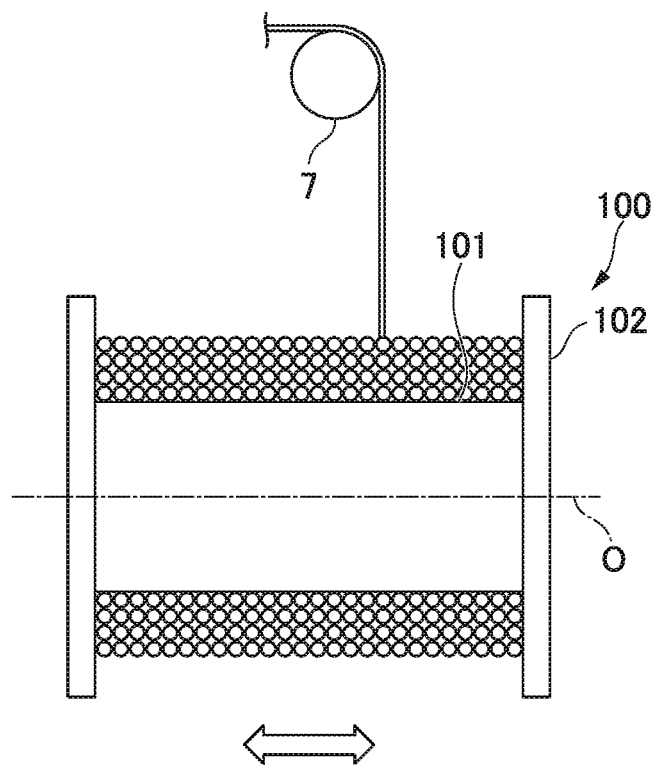
FIG. 7 is a schematic view showing a bobbin with an optical fiber wound by flat winding in accordance with one or more embodiments.

Flat winding refers to a method of winding an optical fiber with the movement distance W in the axial direction equal to a width of the body portion 101 in the axial direction, as shown in FIG. 7. In flat winding, for example, when the flange 102 falls toward the inner side in the axial direction, it becomes difficult to wind the optical fiber in the portion near the flange 102.

In contrast, when the flange 102 extends toward the outer side in the axial direction, winding collapse of the optical fiber in the portion near the flange 102 is likely to occur. Particularly, when a longer optical fiber is wound, the flange 102 may extend toward the outer side in the axial direction due to a pressure at the time of winding the optical fiber, and winding collapse is likely to occur more easily. Also, a method of controlling the movement distance W in the axial direction in accordance with the extension of the flange 102 is also conceivable, but it is not easy to detect a minute extension of the flange 102 of the bobbin 100 rotating at high speed and appropriately perform a change in the movement distance W.

Figure 8:
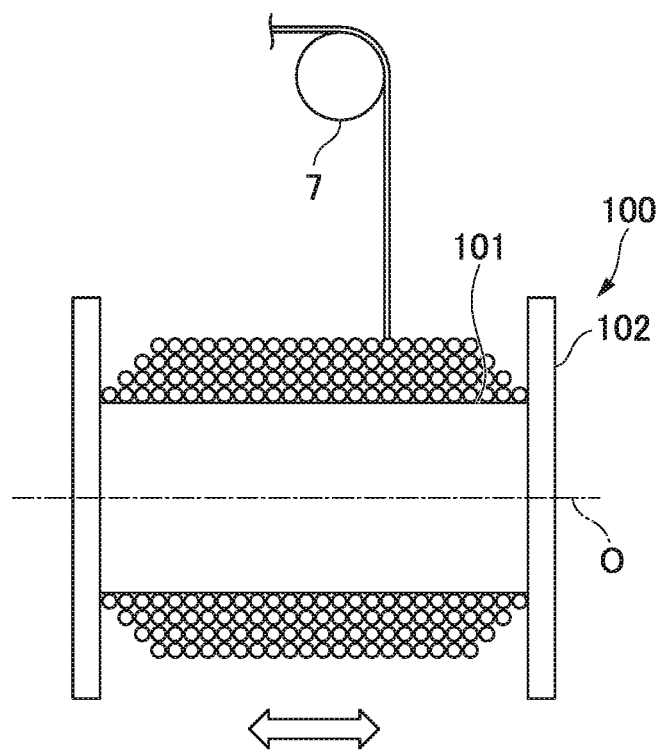
FIG. 8 is a schematic view showing a bobbin with an optical fiber wound by tapered winding in accordance with one or more embodiments.

As shown in FIG. 8, tapered winding refers to a method of winding an optical fiber while decreasing the movement distance W in the axial direction for each reciprocation. In this case, a cross-sectional shape of an optical fiber layer wound around the bobbin 100 is substantially a trapezoid in which a portion on a radial inner side is longer than a portion on a radial outer side. In tapered winding, winding collapse in the portion near the flange 102 is less likely occurs as compared with that in flat winding. However, since a winding amount of the optical fiber in one layer decreases toward the outer side in the radial direction, a length of the optical fiber that can be wound around one bobbin 100 decreases.

As shown in FIG. 2, inverse-tapered winding refers to a method of winding an optical fiber while increasing the movement distance W in the axial direction as a winding diameter increases using a tapered bobbin 8.

In inverse-tapered winding, since the movement distance W is increased by a fixed amount as compared with in the flat winding, winding collapse in the portion near the flange 82 does not easily occur. Further, unlike tapered winding, since a winding amount of the optical fiber per layer increases moving toward the radial outer side, a longer optical fiber can be wound around the bobbin 8.

As described above, inverse-tapered winding has an advantage in that a longer optical fiber can be wound while inhibiting occurrence of winding collapse. However, as described above, it is necessary to appropriately increase the movement distance W in accordance with the flange 82 that extends toward the outer side in the axial direction. Particularly, when the take-up speed is increased in the drawing process, a traverse speed V for moving the final pulley 7 and the bobbin 8 relative to each other in the axial direction needs to be increased according to the take-up speed, and it is not easy to make a winding state of the bobbin 8 satisfactory.

In view showing the above points, the inventors of the embodiments of the invention conducted intensive research on a winding method of the optical fiber for making the winding state satisfactory while increasing the traverse speed V.

(Method of Winding Optical Fiber)

A method of winding an optical fiber according to one or more embodiments will be described with reference to FIGS. 4A to 4E. In the following description, a case in which the bobbin 8 is reciprocated with respect to the fixed final pulley 7 will be described, but the same operation applies when the bobbin 8 is fixed and the final pulley 7 is reciprocated.

Figure 4A:
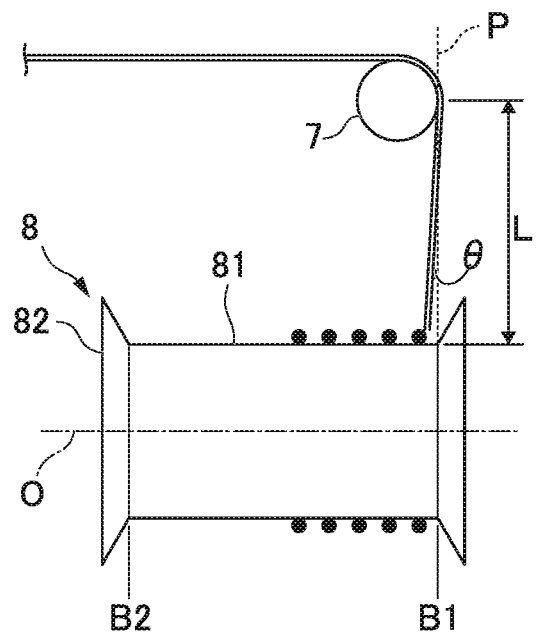
FIG. 4A is a schematic view showing a state in which an optical fiber is wound around a bobbin in accordance with one or more embodiments.

First, a terminal of an optical fiber is fixed to the body portion 81 of the bobbin 8. Then, while rotating the bobbin 8, the bobbin 8 is moved in the axial direction. In an example shown in FIG. 4A, the terminal of the optical fiber is attached to a central portion in the axial direction of the body portion 81, and the bobbin 8 is moved toward the left side of the paper surface. At this time, each time the bobbin 8 makes one rotation, a winding position of the optical fiber moves in the axial direction by a winding pitch. A layer of the optical fiber indicated by black circles in FIG. 4A is taken as a first winding. That is, the first winding refers to an optical fiber wound around the bobbin 8 in a first outward path of a first reciprocation.

The optical fiber is wound up to the first boundary position B1 of the bobbin 8 measured previously by the flange position detection sensor 27, and then a traverse direction is changed to the opposite direction. That is, the reversal position in the first winding is the first boundary position B1.

Figure 4B:
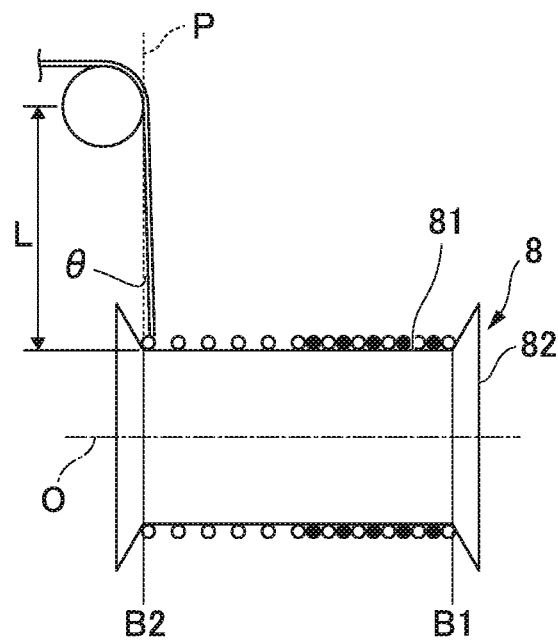
FIG. 4B is a schematic view showing a state in which an optical fiber is wound around the bobbin in accordance with one or more embodiments.

Next, as shown in FIG. 4B, the optical fiber is wound up to the second boundary position B2. A layer of the optical fiber indicated by white circles in FIG. 4B is taken as a second winding. That is, the second winding refers to an optical fiber wound around the bobbin 8 in a return path of the first reciprocation. In FIG. 4B, since the winding pitch is made twice an outer diameter of the optical fiber, the optical fiber of the second winding (white circles) is disposed between the optical fiber of the first winding (black circles).

Here, in order to make a length of the optical fiber wound around the bobbin 8 as long as possible, it is conceivable to use so-called aligned winding in which a winding pitch is made equal to the outer diameter of the optical fiber and optical fibers are aligned in the axial direction without gaps. However, it is not easy to use aligned winding due to static electricity generated by contact between the bobbin 8 and the optical fiber, irregularities on a surface of the body portion 81, vibration of the winder 20, and vibration of the optical fiber occurring at a final path line between the final pulley 7 and the bobbin 8. Therefore, it is preferable that the winding pitch be approximately two to three times the outer diameter of the optical fiber so that the optical fiber is wound with a space of approximately once or twice the outer diameter of the optical fiber.

In the example shown in FIGS. 4A and 4B, since the winding pitch is made twice the outer diameter of the optical fiber, the optical fiber of the second winding is disposed between the optical fiber of the first winding. In this case, since a winding diameter is the same between the first winding and the second winding, the movement distance W need not be increased in the second winding.

Figure 4C:
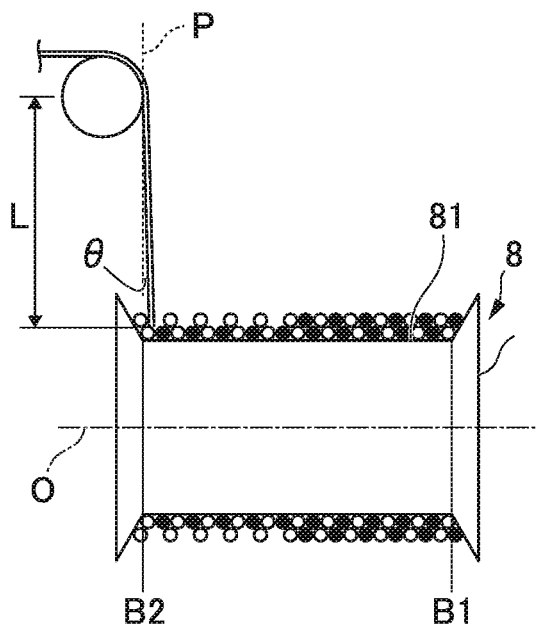
FIG. 4C is a schematic view showing a state in which an optical fiber is wound around the bobbin in accordance with one or more embodiments.

FIG. 4C shows the bobbin 8 in a state in which the optical fiber is wound up to a fourth winding (a return path of the second reciprocation). Since the optical fiber of the third to fourth windings are stacked on the optical fiber of the first and second windings, it would be thought that the movement distance W needs to be increased.

However, in one or more embodiments, it is unnecessary to increase the movement distance W each time the reciprocation is reversed by appropriately setting a delay angle θ to be described below. Therefore, when winding up to the fourth winding, the movement distance W is not increased.

Figure 4D:
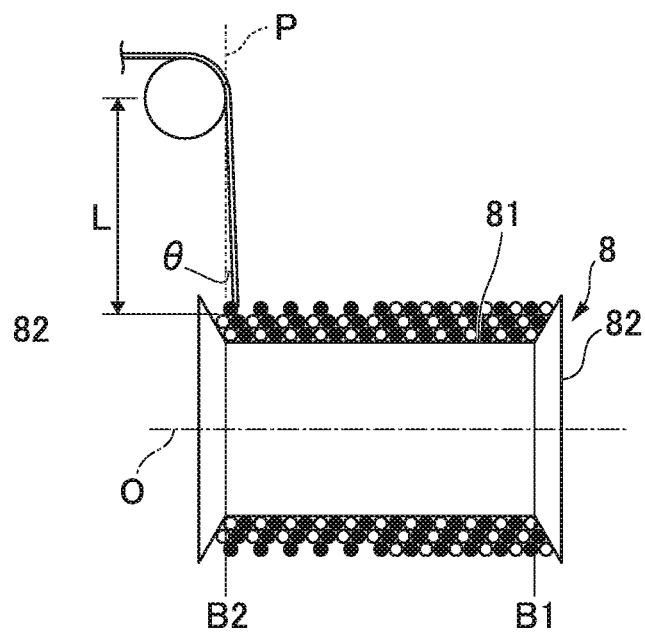
FIG. 4D is a schematic view showing a state in which an optical fiber is wound around the bobbin in accordance with one or more embodiments.

FIG. 4D shows the bobbin 8 in a state in which the optical fiber is wound up to the sixth winding (a return path of the third reciprocation). The optical fiber is wound to be overlaid in three layers. Therefore, in the optical fiber of fifth to sixth windings, the winding diameter increases further. As will be described in detail below, in the reciprocation of the fifth and sixth windings, the reversal position on each of the flanges 82 is moved by the predetermined traverse movement amount W2 toward the outer side in the axial direction. That is, in one or more embodiments, each time the reciprocation is performed twice, the reversal position is updated on each of the flanges 82, and the reversal position is moved by the traverse movement amount W2 toward the outer side in the axial direction.

Figure 4E:
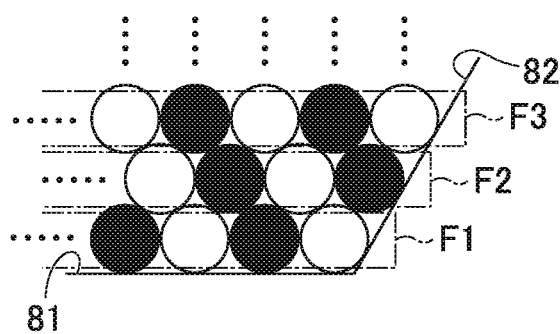
FIG. 4E is an enlarged view showing the portion near a flange when an optical fiber is wound around the bobbin in an ideal state in accordance with one or more embodiments.

FIG. 4E is an enlarged view showing the portion near a boundary between the body portion 81 and the flange 82 when the optical fiber is wound around the bobbin 8 in an ideal state. In FIG. 4E, an optical fiber F1 included in the first layer is wound on an outer circumferential surface of the body portion 81, and positions in the radial direction of the optical fiber F1 are the same as each other. Further, positions in the radial direction of an optical fiber F2 included in the second layer are the same as each other. Similarly, positions in the radial direction of an optical fiber F3 included in the third layer are also the same as each other. In order to wind in this way, it is necessary to update the reversal position according to an increase in winding diameter and an inclination of the inner surface 82a, and gradually move the reversal position outward in the axial direction. Further, the reversal position needs to be updated for each of the two flanges 82.

Here, so-called "dropping" and "winding-over" which occur when the update of the reversal position is inappropriate will be described.

Figure 5A:
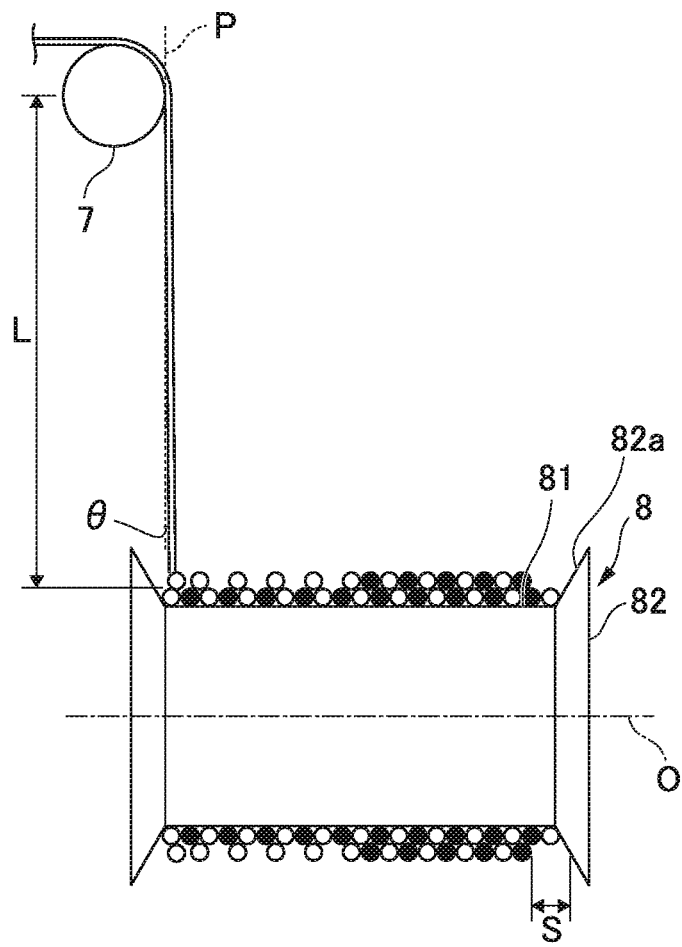
FIG. 5A is a schematic explanatory view showing a dropping phenomenon in accordance with one or more embodiments.

As shown in FIG. 5A, "dropping" refers to a state in which the reversal position in one layer is on the inner side in the axial direction with respect to an ideal position, and occurs due to occurrence of a gap S in the axial direction between an end portion in the axial direction of the layer and the inner surface 82a. When such a gap S occurs, an end portion in the axial direction of the next layer enters (drops into) the gap S. Therefore, when dropping occurs, an end portion in the axial direction of a certain layer is positioned on the radial inner side with respect to a center portion in the axial direction of the layer.

Figure 5B:
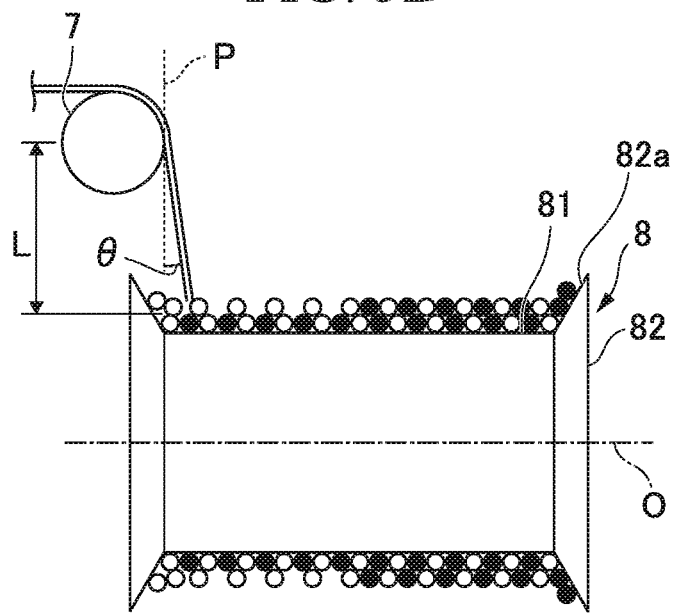
FIG. 5B is a schematic explanatory view showing a winding-over phenomenon in accordance with one or more embodiments.

As shown in FIG. 5B, "winding-over" refers to a state in which the reversal position is on the outer side in the axial direction with respect to an ideal position, and an end portion in the axial direction of one layer rides over the inner surface 82a of the flange 82. When winding-over occurs, an end portion in the axial direction of a certain layer is positioned on the radial outer side with respect to a center portion in the axial direction of the layer.

When these phenomena occur, a position in the radial direction of a certain layer is not uniform in the axial direction, and as a result, winding collapse is likely to occur.

Incidentally, in order to inhibit the above-described "winding-over" and "dropping," it is conceivable to strictly control a positional relationship between the bobbin 8 and the final pulley 7 in the portion near the flange 82 in accordance with a degree of inclination of the inner surface 82a. However, when a backlash of various gears included in the traverse mechanism T, an increase or decrease in relative speed between the bobbin 8 and the final pulley 7 due to reversal of the moving direction, or the like is considered, minute winding disturbance occurs in the portion near the flange 82. Therefore, control of a position of the bobbin 8 with respect to the final pulley 7 is not necessarily reflected directly to a winding position in the axial direction. Therefore, forcibly controlling the winding position in the axial direction of the optical fiber in the portion near the flange 82 is not realistic.

Therefore, in one or more embodiments, an appropriate degree of freedom is given to the optical fiber using a concept of "delay angle θ" which will be described below.

When a moving direction of the bobbin 8 is reversed, a range of the delay angle θ is set so that the optical fiber automatically moves to a stable position in the portion near the inner surface 82a. This will be described in more detail below.

(Delay Angle θ)

The delay angle θ is an inclination of a path line (final path line) of the optical fiber wound around the bobbin 8 with respect to a plane P perpendicular to the central axis O. The delay angle θ (rad) is calculated from Expression (1) by the traverse speed V (mm/sec) and a distance L (mm) from a winding position of the optical fiber toward the bobbin 8 to the final pulley 7 (see 4A to 4D) in the radial direction.

$$\theta = \arctan(V/L) \quad (1)$$

The traverse speed V is a speed at which the bobbin 8 moves in the axial direction in the bobbin traverse method. In the pulley traverse method, a speed at which the final pulley 7 moves in the axial direction of the bobbin 8 is the traverse speed V. Further, the traverse speed V is the moving speed of the bobbin 8 or the final pulley 7 when the speed has reached a steady state in the reciprocation.

The distance L is a distance in the radial direction from the outer circumferential surface of the body portion 81 to the final pulley 7 when the optical fiber is started to be wound around the body portion 81. When the optical fiber is wound around the body portion 81, the distance L decreases as the winding diameter increases.

Also, in one or more embodiments, by setting the following "update of reversal position" at a predetermined frequency, an appropriate degree of freedom is given to the optical fiber wound in the portion near the flange 82. Thus, when the moving direction of the bobbin 8 is reversed, a frequency of updating the reversal position is set so that the optical fiber automatically moves to a stable position in the portion near the inner surface 82a.

Figure 6A:
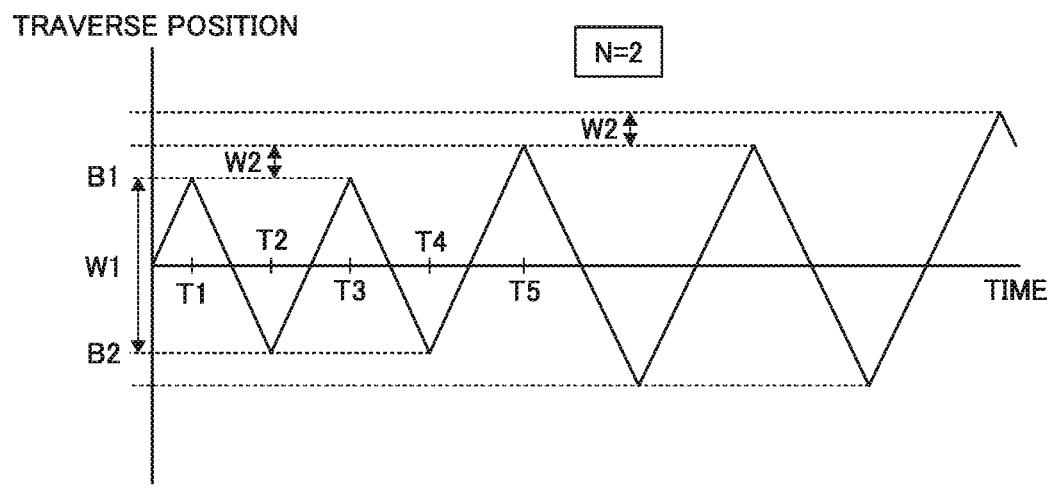
FIG. 6A is an explanatory view showing a frequency of updating a reversal position, and shows a case in which N=2 in accordance with one or more embodiments.
Figure 6B:
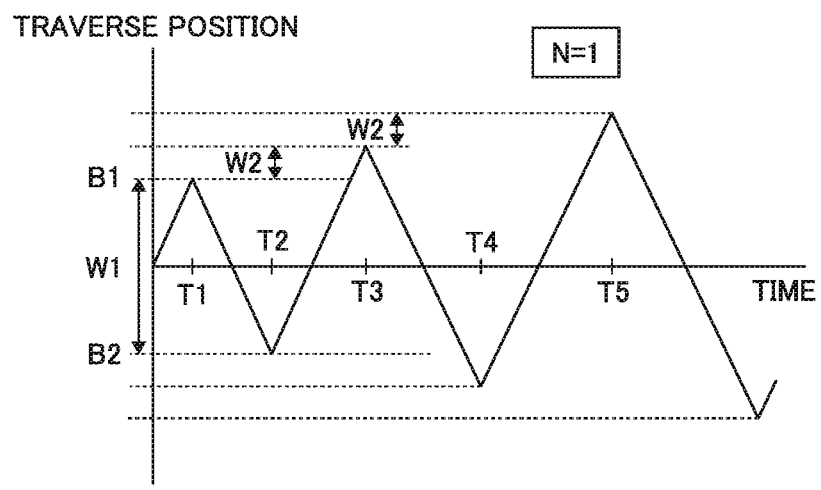
FIG. 6B is an explanatory view showing a frequency of updating a reversal position, and shows a case in which N=1 in accordance with one or more embodiments.

(Update of Reversal Position) In the tapered bobbin 8, it is necessary to update the reversal position to be further outward in the axial direction with a certain frequency in accordance with an increase in the winding amount of the optical fiber. Here, the frequency of updating the reversal position will be described with reference to FIGS. 6A and 6B. In FIGS. 6A and 6B, the horizontal axis represents time and the vertical axis represents a traverse position. Further, the graph shown in FIG. 6A corresponds to the above-described operations shown in FIGS. 4A to 4D.

At time T1 shown in FIG. 6A, the traverse position reaches the first boundary position B1, and the traverse direction is reversed with the first boundary position B1 as the reversal position. Similarly, at the time T2, the traverse position reaches the second boundary position B2, and the traverse direction is reversed with the second boundary position B2 as the reversal position.

Here, at times T3 and T4, the traverse position reaches the boundary positions B1 and B2 again, but in one or more embodiments, the reversal positions at the times T3 and T4 are not changed from the boundary positions B1 and B2. Then, the reversal position is changed at time T5 for the first time, and the reversal position is moved toward the outer side in the axial direction by the traverse movement amount W2.

In this way, in the operation shown in FIG. 6A, the reversal position is updated each time the traverse position reciprocates twice when viewed from one flange 82. In the present specification, the frequency of updating the reversal position is expressed using N which is a positive natural number. For example, in the operation shown in FIG. 6A, since the reversal position is updated each time the reciprocation is performed twice when viewed from one flange 82, the frequency of updating is expressed as N=2. Further, in the operation shown in FIG. 6B, since the reversal position is updated each time the reciprocation is performed (that is, each time) when viewed from one flange 82, the frequency of updating is expressed as N=1.

EXAMPLES

Hereinafter, the above-described embodiments will be described using specific examples. Further, the following examples do not limit the invention.

In Examples 1 to 6 and Comparative examples 1 to 4, winding conditions were changed and the optical fiber was wound around the bobbin 8.

A "bobbin tapered angle" in the following winding condition refers to an inclination of the inner surface 82a toward the outer side in the axial direction with respect to the plane P.

A "distance L at the start of winding" is a distance in the radial direction from a winding position of the optical fiber to the final pulley 7 when the optical fiber is started to be wound around the body portion 81. That is, the distance L at the start of winding is a distance from the outer circumferential surface of the body portion 81 of the bobbin 8 to the final pulley 7.

A "distance L at the end of winding" is a distance in the radial direction from a winding position of the optical fiber to the final pulley 7 when the optical fiber has been wound around the bobbin 8 to a target length. When the optical fiber is wound around the bobbin 8, since the distance L is decreased by an amount corresponding to a winding thickness of the optical fiber wound around the body portion 81, the distance L at the winding end is smaller than the distance L at the start of winding.

A "delay angle θ at the start of winding" and a "delay angle θ at the end of winding" are values calculated by substituting each of the respective distance L and the traverse speed V into Expression (1).

A "frequency of updating reversal position," and the "traverse movement amount W2" indicate conditions for updating the reversal position. That is, in one flange 82 of the bobbin, it indicates that the movement distance W is increased by the traverse movement amount W2 once every N reciprocations. For example, in Example 1 described below, the movement distance W is increased by the traverse movement amount W2 (0.2 mm) each time the reciprocation is performed twice in one flange 82 of the bobbin 8.

Here, the traverse movement amount W2 can be calculated from an increment of the winding diameter in which a winding pitch, an outer diameter of the optical fiber, and the like are taken into account, and the tapered angle of the flange 82 of the bobbin 8. As an example, in the bobbin 8 in which the flange 82 extends toward the outer side in the axial direction by 45° with respect to the plane P, when the winding diameter is increased by 100 μm in the radial direction, the movement distance W in one flange 82 extends by 100 μm in the axial direction. Based on the value calculated in this way, the traverse movement amount W2 can be determined.

A "minimum traverse movement amount" refers to a minimum value of the traverse movement amount W2 settable by the winder 20. The minimum traverse movement amount is sufficiently smaller than the above-described traverse movement amount W2.

Example 1

Using the optical fiber manufacturing apparatus 10, drawing and winding of the optical fiber were performed. The size of the used optical fiber preform M corresponds to 3000 km in drawing length. An outer diameter of the manufactured optical fiber was 0.25 mm.

Winding Conditions
Tapered angle of bobbin: 30°
Traverse speed V: 4 mm/sec
Distance L at the start of winding: 800 mm
Distance L at the end of winding: 600 mm
Delay angle θ at the start of winding: 0.0050 rad
Delay angle θ at the end of winding: 0.0067 rad
Frequency of updating reversal position: once every two reciprocations (N=2)
Traverse movement amount W2: 0.2 mm
Minimum traverse movement amount: 0.05 mm In a winding state of the bobbin-wound optical fiber manufactured under the above conditions, winding disturbance in the portion near the flange 82 was not confirmed, and the winding diameter of the optical fiber in the axial direction was uniform. When a rewinding test was conducted on the bobbin-wound optical fiber, no abnormality, breaking of the optical fiber, or the like occurred at the time of rewinding.

Here, the rewinding test means that the bobbin-wound optical fiber is prepared, the optical fiber is fed from the bobbin, and the fed optical fiber is rewound around a different bobbin.

Example 2

Example 2 is different from Example 1 in winding conditions. Since the other conditions are the same as those in Example 1, a description thereof will be omitted.

Winding Conditions
Tapered angle of bobbin: 30°
Traverse speed V: 25 mm/sec
Distance L at the start of winding: 335 mm
Distance L at the end of winding: 250 mm
Delay angle θ at the start of winding: 0.0745 rad
Delay angle θ at the end of winding: 0.0997 rad
Frequency of updating reversal position: once every five reciprocations (N=5)
Traverse movement amount W2: 0.5 mm
Minimum traverse movement amount: 0.005 mm In a winding state of the bobbin-wound optical fiber manufactured under the above conditions, winding disturbance in the portion near the flange 82 was not confirmed, and a winding diameter of the optical fiber in the axial direction was uniform. When the rewinding test was conducted on the bobbin-wound optical fiber, no abnormality, breaking of the optical fiber, or the like occurred at the time of rewinding.

Example 3

Example 3 is different from Example 1 in winding conditions. Since the other conditions are the same as those in Example 1, a description thereof will be omitted.

Winding Conditions
Tapered angle of bobbin: 30°
Traverse speed V: 10 mm/sec
Distance L at the start of winding: 200 mm
Distance L at the end of winding: 150 mm
Delay angle θ at the start of winding: 0.0500 rad
Delay angle θ at the end of winding: 0.0667 rad
Frequency of updating reversal position: once every three reciprocations (N=3)
Traverse movement amount W2: 0.3 mm
Minimum traverse movement amount: 0.0025 mm In a winding state of the bobbin-wound optical fiber manufactured under the above conditions, winding disturbance in the portion near the flange 82 was not confirmed, and a winding diameter of the optical fiber in the axial direction was uniform. When the rewinding test was conducted on the bobbin-wound optical fiber, no abnormality, breaking of the optical fiber, or the like occurred at the time of rewinding.

Example 4

In Example 4, a 3000 km optical fiber wound around an inverse-tapered bobbin was rewound and the rewinding was performed on the bobbin while cutting the optical fiber off every 300 km. Since the other conditions are the same as those in Example 1, a description thereof will be omitted.

Winding Conditions Tapered angle of bobbin: 45°
Traverse speed V: 4 mm/sec
Distance L at the start of winding: 800 mm
Distance L at the end of winding: 600 mm
Delay angle θ at the start of winding: 0.0050 rad
Delay angle θ at the end of winding: 0.0067 rad
Frequency of updating reversal position: once every five reciprocations (N=5)
Traverse movement amount W2: 0.65 mm
Minimum traverse movement amount: 0.005 mm In a winding state of the bobbin-wound optical fiber manufactured under the above conditions, winding disturbance in the portion near the flange 82 was not confirmed, and a winding diameter of the optical fiber in the axial direction was uniform. When the rewinding test was conducted on the bobbin-wound optical fiber, no abnormality, breaking of the optical fiber, or the like occurred at the time of rewinding.

Example 5

Example 5 is different from Example 1 in winding conditions. Since the other conditions are the same as those in Example 1, a description thereof will be omitted.

Winding Conditions
Tapered angle of bobbin: 30°
Traverse speed V: 20 mm/sec
Distance L at the start of winding: 400 mm
Distance L at the end of winding: 200 mm
Delay angle θ at the start of winding: 0.0500 rad
Delay angle θ at the end of winding: 0.0997 rad
Frequency of updating reversal position: once every two reciprocations (N=2)
Traverse movement amount W2: 0.2 mm
Minimum traverse movement amount: 0.0025 mm In a winding state of the bobbin-wound optical fiber manufactured under the above conditions, winding disturbance in the portion near the flange 82 was not confirmed, and a winding diameter of the optical fiber in the axial direction was uniform. When the rewinding test was conducted on the bobbin-wound optical fiber, no abnormality, breaking of the optical fiber, or the like occurred at the time of rewinding.

Example 6

Example 6 is different from Example 1 in winding conditions. Since the other conditions are the same as those in Example 1, a description thereof will be omitted.

Winding Conditions

Tapered angle of bobbin: 30°

Traverse speed V: 8 mm/sec

Distance L at the start of winding: 400 mm

Distance L at the end of winding: 250 mm

Delay angle θ at the start of winding: 0.0200 rad

Delay angle θ at the end of winding: 0.0320 rad

Frequency of updating reversal position: once every four reciprocations (N=4)

Traverse movement amount W2: 0.8 mm

Minimum traverse movement amount: 0.0025 mm

In a winding state of the bobbin-wound optical fiber manufactured under the above conditions, winding disturbance in the portion near the flange 82 was not confirmed, and a winding diameter of the optical fiber in the axial direction was uniform. When the rewinding test was conducted on the bobbin-wound optical fiber, no abnormality, breaking of the optical fiber, or the like occurred at the time of rewinding.

Comparative Example 1

Comparative example 1 is different from Example 1 in winding conditions. Also, the frequency of updating the reversal position and the traverse movement amount W2 were changed, and the optical fiber was wound around the bobbin 8 under update conditions A and B of two reversal positions, respectively. Since the other conditions are the same as those in Example 1, a description thereof will be omitted.

Winding Conditions

Tapered angle of bobbin: 30°

Traverse speed V: 3 mm/sec

Distance L at the start of winding: 650 mm

Distance L at the end of winding: 610 mm

Delay angle θ at the start of winding: 0.0046 rad Delay angle θ at the end of winding: 0.0049 rad (Condition a for Updating Reversal Position)

Frequency of updating reversal position: once every two reciprocations (N=2)

Traverse movement amount W2: 0.2 mm (Condition B for Updating Reversal Position)

Frequency of updating reversal position: once every five reciprocations (N=5)

Traverse movement amount W2: 0.5 mm

Minimum traverse movement amount: 0.05 mm

In both the bobbin-wound optical fibers manufactured under the above-described two conditions A and B, winding disturbance in the portion near the flange 82 on both sides was confirmed. Also, a winding diameter of the optical fiber in the axial direction was not uniform, and irregularities on the surface were observed. When the rewinding test was conducted on the bobbin-wound optical fiber, disturbance (hunting) occurred in a feeding dancer at the time of rewinding from the bobbin, and breaking of the optical fiber occurred once.

Comparative Example 2

Comparative example 2 is different from Comparative example 1 in winding conditions. Since the other conditions are the same as those in Comparative example 1, a description thereof will be omitted.

Winding Conditions

Tapered angle of bobbin: 30°

Traverse speed V: 4 mm/sec

Distance L at the start of winding: 800 mm

Distance L at the end of winding: 600 mm

Delay angle θ at the start of winding: 0.0050 rad

Delay angle θ at the end of winding: 0.0067 rad (Condition C for Updating Reversal Position)

Frequency of updating reversal position: once for each reciprocation (N=1)

Traverse movement amount W2: 0.1 mm (Condition D for Updating Reversal Position)

Frequency of updating reversal position: once every six reciprocations (N=6)

Traverse movement amount W2: 0.6 mm

Minimum traverse movement amount: 0.05 mm

In both the bobbin-wound optical fibers manufactured under the above-described two conditions C and D, winding disturbance in the portion near the flange 82 on both sides was confirmed. Also, a winding diameter of the optical fiber in the axial direction was not uniform, and irregularities on the surface were observed. When the rewinding test was conducted on the bobbin-wound optical fiber, hunting occurred in the feeding dancer at the time of rewinding from the bobbin, and breaking of the optical fiber occurred twice.

Comparative Example 3

Comparative example 3 is different from Comparative example 1 in winding conditions. Since the other conditions are the same as those in Comparative example 1, a description thereof will be omitted.

Winding Conditions

Tapered angle of bobbin: 30°

Traverse speed V: 30 mm/sec

Distance L at the start of winding: 350 mm

Distance L at the end of winding: 280 mm

Delay angle θ at the start of winding: 0.0855 rad

Delay angle θ at the end of winding: 0.1067 rad (Condition E for updating reversal position)

Frequency of updating reversal position: once for each reciprocation (N=1)

Traverse movement amount W2: 0.1 mm (Condition F for updating reversal position)

Frequency of updating reversal position: once every six reciprocations (N=6)

Traverse movement amount W2: 0.6 mm

Minimum traverse movement amount: 0.005 mm

In both the bobbin-wound optical fibers manufactured under the above-described two conditions E and F, winding disturbance in the portion near the flange 82 on both sides was confirmed. Also, a winding diameter of the optical fiber in the axial direction was not uniform, and irregularities on the surface were observed. When the rewinding test was conducted on the bobbin-wound optical fiber, hunting occurred in the feeding dancer at the time of rewinding from the bobbin, and breaking of the optical fiber occurred three times.

Comparative Example 4

Comparative example 4 is different from Comparative example 1 in winding conditions. Since the other conditions are the same as those in Comparative example 1, a description thereof will be omitted.

Winding Conditions
Tapered angle of bobbin: 30°
Traverse speed V: 40 mm/sec
Distance L at the start of winding: 350 mm
Distance L at the end of winding: 280 mm
Delay angle θ at the start of winding: 0.1138 rad
Delay angle θ at the end of winding: 0.1419 rad
(Condition G for Updating Reversal Position)
Frequency of updating reversal position: once every two reciprocations (N=2) Traverse movement amount W2: 0.1 mm
(Condition H for Updating Reversal Position)
Frequency of updating reversal position: once every five reciprocations (N=5)
Traverse movement amount W2: 0.5 mm
Minimum traverse movement amount: 0.005 mm In both the bobbin-wound optical fibers manufactured under the above-described two conditions G and H, winding disturbance in the portion near the flange 82 on both sides was confirmed. Also, a winding diameter of the optical fiber in the axial direction was not uniform, and irregularities on the surface were observed. When the rewinding test was conducted on the bobbin-wound optical fiber, hunting occurred in the feeding dancer at the time of rewinding from the bobbin, and breaking of the optical fiber occurred twice.

The results of the above Examples and Comparative examples are summarized in Table 1 below.

"N" in Table 1 represents the frequency of updating the reversal position. For example, in the first example, since the reversal position is updated each time the reciprocation is performed twice, it is expressed as N=2.

Also, "Initial L" and "Initial θ" in Table 1 represent the distance L at the start of winding and the delay angle θ at the start of winding, respectively. Further, "End L" and "End θ" in Table 1 represent the distance L at the end of winding and the delay angle θ at the end of winding, respectively.

In "Results," it is expressed as OK (satisfactory) when the winding state of the manufactured bobbin-wound optical fiber is satisfactory, and it is expressed as NG (defective) when there is winding disturbance in the winding state.

TABLE 1

| | V (mm/sec) | Initial L (mm) | Initial θ (rad) | N | W2 (mm) | End L (mm) | End θ (rad) | Results |
|---|---|---|---|---|---|---|---|---|
| Example 1 | 4 | 800 | 0.0050 | 2 | 0.2 | 600 | 0.0067 | OK |
| Example 2 | 25 | 335 | 0.0745 | 5 | 0.5 | 250 | 0.0997 | OK |
| Example 3 | 10 | 200 | 0.0500 | 3 | 0.3 | 150 | 0.0667 | OK |
| Example 4 | 4 | 800 | 0.0050 | 5 | 0.65 | 600 | 0.0067 | OK |
| Example 5 | 20 | 400 | 0.0500 | 2 | 0.2 | 200 | 0.0997 | OK |
| Example 6 | 8 | 400 | 0.0200 | 4 | 0.8 | 250 | 0.0320 | OK |
| Comparative example 1 (Condition A) | 3 | 650 | 0.0046 | 2 | 0.2 | 610 | 0.0049 | NG |
| Comparative example 1 (Condition B) | 3 | 650 | 0.0046 | 5 | 0.5 | 610 | 0.0049 | NG |
| Comparative example 2 (Condition C) | 4 | 800 | 0.0050 | 1 | 0.1 | 600 | 0.0067 | NG |
| Comparative example 2 (Condition D) | 4 | 800 | 0.0050 | 6 | 0.6 | 600 | 0.0067 | NG |
| Comparative example 3 (Condition E) | 30 | 350 | 0.0855 | 1 | 0.1 | 280 | 0.1067 | NG |
| Comparative example 3 (Condition F) | 30 | 350 | 0.0855 | 6 | 0.6 | 280 | 0.1067 | NG |
| Comparative example 4 (Condition G) | 40 | 350 | 0.1138 | 2 | 0.1 | 280 | 0.1419 | NG |
| Comparative example 4 (Condition H) | 40 | 350 | 0.1138 | 5 | 0.5 | 280 | 0.1419 | NG |

As shown in Table 1, in Examples 1 to 6, when N=2 to 5 and the delay angle θ was 0.0050 to 0.0997, a bobbin-wound optical fiber in a satisfactory winding state could be obtained even under a high speed winding condition with a traverse speed V of 4 mm/sec or more.

However, in Comparative examples 2 and 3 in which N=1 or 6, a bobbin-wound optical fiber in a satisfactory winding state could not be obtained irrespective of a value of the delay angle θ.

In Comparative examples 1 and 4 in which N=2 or 5, although the delay angle θ was 0.0049 or less or 0.1138 or more, a bobbin-wound optical fiber in a satisfactory winding state could not be obtained.

From these results, preferable ranges of the delay angle θ and the frequency of updating the reversal position are as follows.

The delay angle θ (rad) was 0.0050 in Example 1 and 0.0049 in Comparative example 1. Also, the delay angle θ (rad) was 0.0997 in Examples 2 and 5, and was 0.1138 in Comparative example 4. From this, the delay angle θ (rad) is preferably 0.0050 to 0.1000.

Further, from the results of Comparative examples 2 and 3, the delay angle θ (rad) is preferably 0.0050 to 0.1000, and the frequency of updating the reversal position is preferably twice or more and 5 times or less.

Next, the critical significance of upper and lower limit values of the delay angle θ and the N representing the frequency of updating the number of times of the reversal will be described in more detail.

First, a case in which the delay angle θ is small is considered. When the delay angle θ is small, it means that the distance L is excessively large with respect to the traverse speed V, and a degree of freedom of the optical fiber is excessively large. When the degree of freedom is excessively large, a sensitivity of adjusting the winding position (landing point) of the optical fiber by position control of the bobbin 8 in the axial direction becomes excessively small, the winding position cannot be effectively adjusted, and a position of an end portion in the axial direction for each layer of the optical fiber becomes unstable. As a result, for example, as shown in FIG. 5A, the gap S in the axial direction is generated between a layer of the optical fiber and the flange 82, causing a "dropping" phenomenon in the next layer. Then, according to the result of Table 1, it can be considered that excessive increase in the degree of freedom of the optical fiber can be inhibited by setting the delay angle θ to 0.0050 or more. Next, a case in which the delay angle θ is large is considered. When the delay angle θ is large, it means that the distance L is excessively small with respect to the traverse speed V, and the degree of freedom of the optical fiber is excessively small. When the degree of freedom is excessively small, automatic correction of the winding position of the optical fiber does not work, and winding disturbance tends to occur due to an increase or decrease in the relative speed of the bobbin 8 with respect to the final pulley 7 and an influence of backlash of the traverse mechanism T. As a result, for example, as shown in FIG. 5B, a "winding-over" phenomenon tends to occur. Then, according to the result of Table 1, it can be considered that excessive decrease in the degree of freedom of the optical fiber can be prevented by setting the delay angle θ to 0.1000 or less.

Also, from the results of Table 1, it was found that the winding state was stabilized when the reversal position was updated each time the reciprocation was performed twice or more and five times or less than when the reversal position is updated each time the reciprocation is performed (that is, N=1). The reason for this is thought that a degree of freedom of automatically rolling to a place at which the optical fiber was stabilized in a well-balanced manner could be given when the reversal position was updated each time the reciprocation is performed twice or more and five times or less. For example, when the delay angle θ occurs, minute winding disturbance may occur in the portion near the flange 82. For this reason, even when minute winding disturbance occurs, since there is an appropriate degree of freedom, the optical fiber of an upper layer can be disposed to correct the winding disturbance.

On the other hand, for example, in condition C of Comparative example 2, despite the fact that the delay angle θ was 0.0050 to 0.1000, winding disturbance in the portion near the flange 82 was confirmed. The reason for this is thought that since the reversal position was updated once for each reciprocation, the above-described degree of freedom was decreased and it was not possible to obtain a winding state in which the winding disturbance of the lower layer optical fiber was taken into account. That is, since the optical fiber was further wound on the upper layer while the minute winding disturbance was not corrected, it is thought that winding-over or dropping enough to be visually checked occurred as the winding amount was increased.

Also, in condition D of Comparative example 2, the reversal position was updated once every six reciprocations (N=6), but satisfactory results could not be obtained. Here, since the degree of freedom of the optical fiber increases as a value of N becomes larger, it is conceivable that better results may be obtained. However, when N=6, for example, the traverse movement amount W2 increased at one time is approximately 6 times that of the case of N=1. That is, the larger the value N, the larger the reversal position is moved. In this case, it can be conceivable that the rapid increase in traverse movement amount W2 cannot be coped with, and winding disturbance occur in the portion near the flange 82.

As described above, the method of winding an optical fiber of one or more embodiments is a method of winding an optical fiber using the bobbin 8 including the body portion 81 and the flanges 82 provided at both end portions in the axial direction of the body portion 81 and in which the inner surface 82a of the flange 82 is inclined to be directed toward the outer side in the axial direction toward the radial outer side, in which the final pulley 7 that guides the optical fiber to the bobbin 8 and the bobbin 8 perform reciprocation relative to each other in the axial direction at the traverse speed V (mm/sec), and 0.0050≤θ≤0.1000 is satisfied when a distance from the winding position of the optical fiber at the bobbin 8 to the final pulley 7 in the radial direction is set as L (mm) and a delay angle calculated from θ=arctan (V/L) is set as θ (rad).

When the traverse speed V becomes high, minute winding disturbance is likely to occur at the time of winding the optical fiber. Particularly, in the portion near the flange 82, the winding disturbance is more likely to occur due to increase or decrease in the relative speed between the bobbin 8 and the final pulley 7 according to the reversal of the moving direction.

When the delay angle θ is set to be within the above-described range, even when minute winding disturbance occurs, since it is possible to give the optical fiber a degree of freedom in which the optical fiber automatically rolls to a place at which the optical fiber is stabilized in a well-balanced manner, a satisfactory winding state can be obtained.

Also, the reversal position at which the moving direction of the reciprocation is reversed at the respective flanges 82 is updated to be further outward in the axial direction each time the reciprocation is performed N times, and N is preferably a natural number of 2 to 5.

In the tapered bobbin 8 in which the inner surface 82a of the flange 82 is inclined, it is necessary to control the winding position of the optical fiber wound on the inner surface 82a in accordance with an increase in the winding amount of the optical fiber. When the frequency of updating the reversal position is caused to be within the above-described range, since it is possible to give the optical fiber a degree of freedom in which the optical fiber automatically rolls to a place at which the optical fiber is stabilized in a well-balanced manner in the portion near the flange 82, a satisfactory winding state can be obtained.

Also, when the delay angle θ satisfies 0.0050≤θ≤0.0500 and the value of N is 3 to 5, a more satisfactory winding state of the optical fiber can be obtained.

Further, the method of manufacturing the bobbin-wound optical fiber of one or more embodiments includes a process of obtaining the bobbin-wound optical fiber by winding the optical fiber around the bobbin 8 using the above-described method of winding an optical fiber.

Therefore, it is possible to manufacture the bobbin-wound optical fiber with a satisfactory winding state.

Further, the optical fiber winder 20 is an optical fiber winder which winds the optical fiber using the bobbin 8 including the body portion 81 and the flanges 82 provided at both end portions in the axial direction of the body portion 81 and in which the inner surface 82a of the flange 82 is inclined to be directed toward the outer side in the axial direction toward the radial outer side, and includes the final pulley 7 that guides the optical fiber to the bobbin 8 and the traverse mechanism T which relatively reciprocates the bobbin 8 and the final pulley 7 in the axial direction at the traverse speed V (mm/sec), in which, the traverse mechanism T reciprocates the bobbin 8 or the final pulley 7 so that $0.0050 \leq \theta \leq 0.1000$ is satisfied when a distance from the winding position of the optical fiber at the bobbin 8 to the final pulley 7 in the radial direction is set as L (mm) and a delay angle calculated from $\theta = \arctan(V/L)$ is set as $\theta$ (rad).

Therefore, the above-described operation and effects can be obtained.

Further, the optical fiber strand manufacturing apparatus 10 of one or more embodiments includes the drawing unit 1 in which the optical fiber preform M is drawn to form a bare optical fiber, the coater 9 which forms an optical fiber strand by providing a coating layer on an outer circumference of the bare optical fiber, the take-up unit 5 which takes up the optical fiber strand, and the optical fiber winder 20.

Therefore, the winding state of the optical fiber on the bobbin 8 can be made satisfactory even when a manufacturing linear velocity of the optical fiber is increased.

The technical scope of the invention is not limited to the above embodiments, and various modifications may be made without departing from the scope of the invention.

For example, in the above one or more embodiments, the winding pitch is twice the outer diameter of the optical fiber, but it may be twice or less or twice or more.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of winding an optical fiber, comprising:
   winding the optical fiber using a bobbin that comprises:
   a body portion having two end portions; and
   a pair of flanges, respectively disposed at the end portions in an axial direction of the body portion, wherein
   an inner surface of each of the flanges is inclined toward an outer side in the axial direction and toward a radial outer side, and
   guiding the optical fiber to the bobbin using a final pulley, wherein
   the bobbin and the final pulley reciprocate relative to each other in the axial direction at a traverse speed V (mm/sec) such that $0.0050 < \theta \text{ (rad)} < 0.1000$, where
   $\theta$ is a delay angle,
   $\theta = \arctan(V/L)$, and
   L (mm) is a distance from a winding position of the optical fiber at the bobbin to the final pulley in a radial direction, and
   a path line of the optical fiber wound around the bobbin from the final pulley is inclined to the delay angle $\theta$ with respect to a plane perpendicular to a central axis of the bobbin, such that a winding position at which the optical fiber is wound around the bobbin is located in a more rearward position than a separation position at which the optical fiber is separated from the final pulley in a traveling direction that the final pulley travels with respect to the bobbin with the traverse speed V.

2. The method of winding the optical fiber according to claim 1, wherein
   a reversal position where a moving direction of the reciprocation is reversed at the respective flanges is adjusted to be further outward in the axial direction each time the reciprocation is performed N times, where N is a natural number of 2 to 5.

3. The method of winding the optical fiber according to claim 2, wherein $0.0050 \leq \theta \leq 0.0500$, and N is 3 to 5.

4. A method of manufacturing a bobbin-wound optical fiber comprising:
   using the method of winding the optical fiber according to claim 1.

5. An optical fiber winder comprising:
   a bobbin mounting portion where a bobbin is mounted, wherein the bobbin comprises:
   a body portion having two end portions; and
   a pair of flanges, respectively disposed at the end portions in an axial direction of the body portion, wherein
   an inner surface of each of the flanges is inclined toward an outer side in the axial direction and toward a radial outer side;
   a final pulley that guides an optical fiber to the bobbin; and
   a traverse mechanism that relatively reciprocates the bobbin and the final pulley in the axial direction at a traverse speed V (mm/sec), wherein
   the traverse mechanism reciprocates the bobbin or the final pulley such that $0.0050 < \theta \text{ (rad)} \leq 0.1000$, where
   $\theta$ is a delay angle,
   $\theta = \arctan(V/L)$, and
   L (mm) is a distance from a winding position of the optical fiber at the bobbin to the final pulley in a radial direction, and
   a path line of the optical fiber wound around the bobbin from the final pulley is inclined to the delay angle $\theta$ with respect to a plane perpendicular to a central axis of the bobbin, such that a winding position at which the optical fiber is wound around the bobbin is located in a more rearward position than a separation position at which the optical fiber is separated from the final pulley in a traveling direction that the final pulley travels with respect to the bobbin with the traverse speed V.

6. An optical fiber strand manufacturing apparatus comprising:
   a drawing unit where an optical fiber preform is drawn to form a bare optical fiber;
   a coater that forms the optical fiber strand by disposing a coating layer on an outer circumference of the bare optical fiber;
   a take-up unit that takes up the optical fiber strand; and
   the optical fiber winder according to claim 5.

* * * * *